Jan. 11, 1955
M. E. BINKLEY
2,699,097
METHOD OF MANUFACTURE OF HEAT INSULATING SHAPES
Filed March 20, 1953
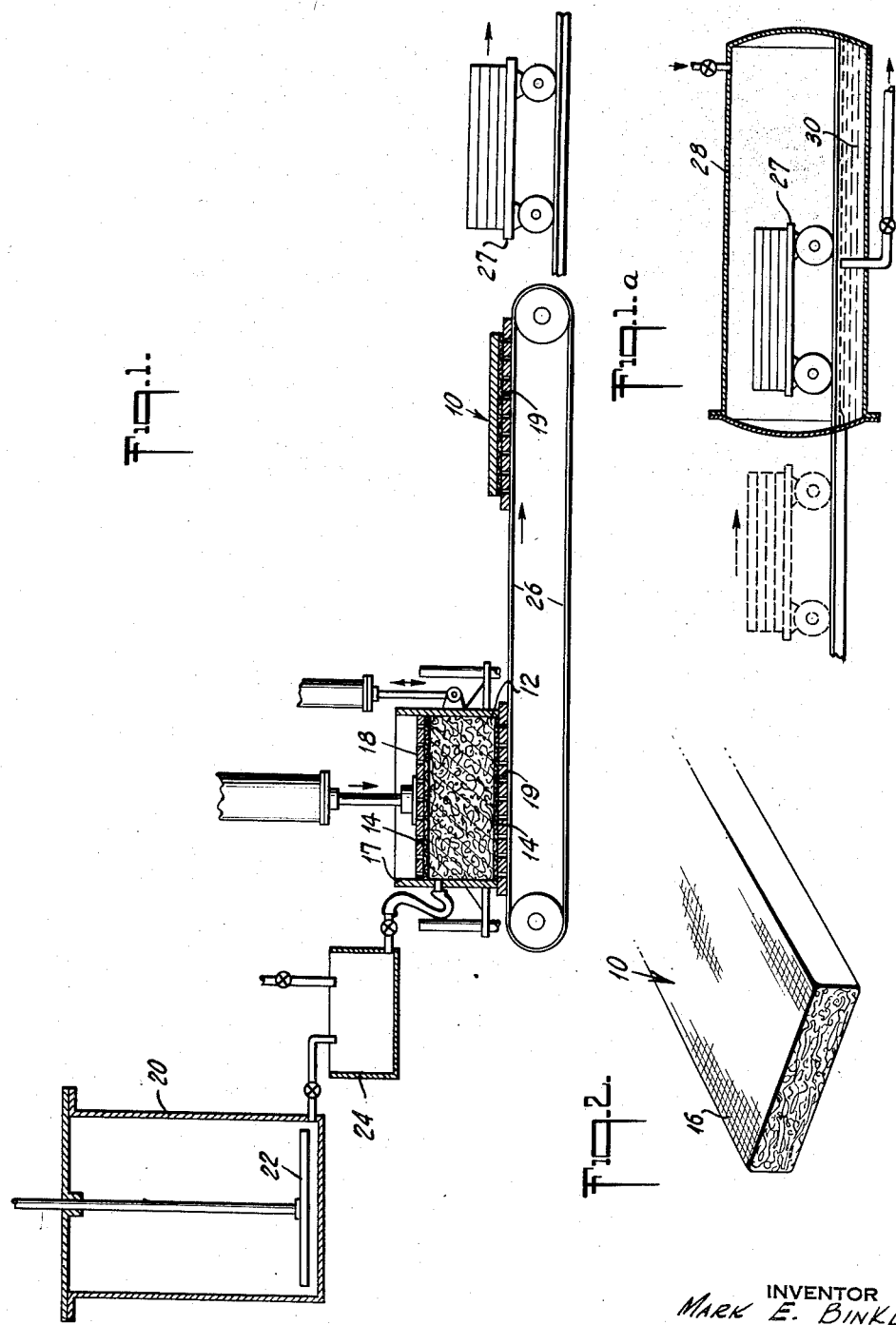
INVENTOR
*MARK E. BINKLEY*
BY *Virgil C. Kline*
ATTORNEY

United States Patent Office 2,699,097
Patented Jan. 11, 1955

2,699,097

METHOD OF MANUFACTURE OF HEAT INSULATING SHAPES

Mark E. Binkley, Somerville, N. J., assignor to Johns-Manville Corporation, New York, N. Y., a corporation of New York Application March 20, 1953, Serial No. 343,559

10 Claims. (Cl. 92—55)

This invention relates to molded thermal insulation, and is particularly directed to an improved light weight thermal insulation and structural shape and method of manufacturing the same.

This application is a continuation-in-part of my copending application Serial No. 46,854, filed August 30, 1948, now abandoned.

Various procedures have been proposed for the formation of thermal insulating bodies by well known reactions between cellular siliceous materials, water, and lime, to form hydrous calcium silicate. These procedures can be divided into two general types, pan casting and filter molding. In the former, an amount of relatively concentrated slurry, containing a volume of water equal to the volume of the mold, is cast to form, and while in the mold, the body is cured, with subsequent removal of the water by drying. Filter molding can be either piston press filter molding or pressure filtration molding. In both types of filter molding, a relatively dilute slurry is charged to a mold, a substantial amount of water is expressed or filtered therefrom and the molded body removed from the mold, cured and dried. Obviously, the latter procedures have substantial commercial advantages over the former, due to the relatively high expense in providing and maintaining the large number of individual molds necessary for the production of any substantial number of insulating bodies by pan casting.

As between the two types of filter molding, substantial advantages are realized when employing piston press filter molding, if a slurry of suitable character can be formed. The foremost advantage of this procedure is that the insulating bodies may be molded to precise dimensions. In all other procedures it is necessary to subject the formed bodies to trimming and shaping, with the inherent disadvantages in such operations of extra, costly manipulative steps and substantial waste of materials. Furthermore, piston press filter molding results in a body having a transverse layered, uniformly laminated structure, which structure is of substantial significance insofar as the thermal conductivity of the body is concerned. In pressure filtration molding, swirling of the slurry prevents the formation of such a laminated structure. From these considerations, it is clear that in all manufacturing methods the characteristics of the insulating bodies formed depend upon the specific manipulative steps and reaction conditions of the procedures employed in their preparation.

In accordance with this invention, hydrous calcium silicate insulating bodies are formed by a process involving a slurry forming and mixing procedure, a specific slurry prereaction step, piston press filter molding, and pressure steam induration. It has been proposed in the art to prereact a lime-silica slurry under certain conditions (see Teitsworth U. S. Patent No. 1,520,893 and Huttemann et al. No. 1,932,971), which slurry is subsequently employed to form an insulating body by a pan casting or filtration molding procedure. The products formed in accordance with those disclosures substantially differ from those formed in accordance with this invention in structure and relative density and strength. It has been found that bodies formed by filter press molding a slurry produced by the procedures of those disclosures exhibit a density not substantially better than 15 lbs./cu. ft. with a strength density ratio of only about 4–5. The products obtained when employing the specific mixing procedure, reaction conditions, molding, and curing used in this invention, however, may be precision molded with a density as low as approximately 8 lbs./cu. ft., and all exhibit a strength/density ratio of from 6–25. It is apparent that such relatively lighter, stronger, and precision-dimensioned bodies are most desirable, particularly when it is considered that the thermal conductivity of such insulating bodies is inversely related to their density.

Accordingly, an object of this invention is to provide a method of manufacturing precision molded thermal insulation block of high strength and low density and thermal conductivity which can withstand prolonged exposure to temperatures of the order of 1200° F. without substantial shrinkage or weight loss.

Another object is to provide a simple and economical method of producing thermal insulation blocks and structural panels of relatively low density having durability and strength at high temperatures.

A further object is to provide a method of manufacturing high temperature-resistant insulation blocks having transverse strength and thermal conductivity properties which compare favorably with those of blocks having not to exceed half the temperature resistance of the subject blocks.

With the above objects and features in view, the invention consists in the improved insulation block and method of manufacture which are hereinafter described and more particularly defined in the accompanying claims.

In the following description, reference will be made to the attached drawings, in which:

Fig. 1 presents in side elevation a schematic flow sheet portrayal of the principal apparatus requirements of the process;

Fig. 1a is a side elevation portrayal of the last, or steam autoclave, stage of the process; and, Fig. 2 is a perspective fragmentary view of a molded low density high strength insulating block such as herein described and claimed.

The principal ingredients which are reacted to produce the present insulation shapes include a cellular siliceous material and hydrated lime. Another necessary ingredient is a reinforcing mineral fiber which is heat resistant. The mineral fiber need be present only in minor proportion by weight of the total solids, for example, about 10–40% of finely divided heat-resistant fibers such as glass, mineral wool, and asbestos, preferably amphibole or amosite asbestos. The preferred siliceous component is finely divided diatomaceous silica. A suitable diatomaceous silica is a natural uncalcined earth having a bulk density of 5–15 lbs./cu. ft. The principal reactive component of the composition is hydrated or caustic lime. The molding composition may also include small amounts of a water-swellable clay such as bentonite to impart additional strength.

The low density insulation shapes 10 (Fig. 2) are precision molded to final shape and dimensions in a mechanical piston press filter mold 12 (Fig. 1) having its major surface areas perforated and faced with fine mesh metal screen 14, whereby the mold charge can be rapidly dewatered and the solids content thereof compacted under substantial mechanical pressure to immediately develop adequate shape-retaining cohesive strength in the resulting wet molded block. By using a precision molding operation of this type it is possible to produce finished blocks of higher strength for a given low density, and, since no further treatment is required to reduce the blocks to final dimensions, there is no waste trim scrap. The major surface areas of the final heat cured block bear thereon impressions 16 of the mold screen linings 14. Since the ultimate low density of the insulating blocks results from an extensive prereaction of the molding constituents prior to the mechanical pressure filter molding treatment, and since this initial prereaction can only be carried out to a satisfactory degree in an aqueous suspension permitting full prereaction gel expansion of the solids content of the slurry, the molding slurry is preferably formed differently from, and necessarily is much more dilute than, slurries heretofore employed for the production of insulating blocks of comparable composition and low density, regardless of the molding procedure used.

A suitable solids composition for the molding slurry comprises about 10% by weight of willowed and well-opened heat-resistant asbestos fibers, preferably amosite or a mixture of chrysotile and amosite asbestos fibers, and approximately 90% by weight of finely divided diatomaceous silica and caustic or hydrated lime. The diatomaceous silica and lime which make up the principal binder ingredients of the preferred molding composition are present in approximately stoichiometric proportions. Additional heat resistance may be imparted, with some sacrifice of strength, by using an excess proportion of diatomaceous silica or equivalent siliceous material. For example, the molding mixture may comprise two parts by weight of diatomaceous silica, or a mixture of about one part each of diatomaceous silica and finely divided heat-expanded perlite, with one part by weight of caustic lime.

In the preferred embodiment of this invention, the staple reinforcing fiber, finely divided siliceous material, and water-swellable clay, if employed, are initially mixed with sufficient water to form a mixture having a consistency sufficiently light to enable its transportation by conventional slurry pumping mechanisms. The thus formed mixture is then diluted to approximately 15 parts by weight of water per part of suspended solids with sufficient agitation to insure dispersion of all ingredients. This dilution, suspension and agitation may be conveniently performed in a tank 20 (Fig. 1) having any suitable agitating means such as a non-permeable reciprocating plate agitator 22. This suspension is preferably then heated to a temperature within the range of approximately 170–210° F. While the suspension of earth and fiber is being heated, the lime is dispersed in sufficient hot or cold water to obtain a pumpable suspension, as for example, 4–5 parts of water per part of lime. When the suspension of fiber and earth has obtained the desired temperature, the lime dispersion is fed to the suspension, wherein reaction of the divided lime and divided siliceous material immediately commences if the suspension has been heated within the indicated temperature range. Agitation is maintained only until a thorough dispersion and mixing of the lime, fiber, and diatomaceous earth is obtained. Other suitable mixing procedures may be employed in the formation of such a slurry, so long as the aforementioned critical water to solids ratio is obtained and the slurry heated to the indicated temperature before or after all ingredients have been added. However, the aforesaid procedure has been found particularly advantageous in this invention, since its use not only substantially eliminates the formation of undesirable lime and/or lime-silica aggregates obtained when the ingredients are initially mixed in dry or semi-dry form; but it also enables excellent control of the critical reaction conditions, and results in the formation of insulating bodies having relatively lower densities and yet better strength than those formed using essentially the same procedure, but using other mixing techniques.

After the slurry has been formed, it is subjected to a treatment designed to develop extensive prereaction and volume expansion of the solids to improve the water-retaining capacity and gel characteristics of the molding mixture. This prereaction gel forming treatment is carried out as in tank 20 by quiescent reaction at the elevated temperature in the aforementioned range of approximately 170–210° F. for a reaction period of about one-half to three hours. The principal controlling factors in this prereaction stage are those of dilution and temperature, since it has been found that the critical gel forming and swelling prereaction is developed only at temperatures in the range of 170–210° F. and that it is only within a slurry of the specified dilution that it is possible to develop optimum volume expansion and formation of the voluminous fiber-linked prereacted hydrous calcium silicate gel flocculent agglomerates which have the bulking, water-retaining, and free filtering characteristics which are necessary for developing high strength with low density in the thermal insulating bodies of this invention.

Periodically during the period of prereaction, as for example, after about one-half hour of quiescent reaction, it is often desirable to subject the slurry undergoing prereaction to mild agitation. A suitable mild agitation can be developed by raising and lowering the agitator 22 within the body of slurry undergoing prereaction, so as to develop uniform dispersion and suspension of the slurry solids throughout the body of the slurry. This period of quiescent prereaction, with periodic mild agitation, develops homogeneity of the slurry solids suspension and gel thickening thereof. Also during this stage, and prior to the subsequent mechanical pressure molding operation, the individual gel particles in the slurry are substantially enlarged and the water-retaining capacity of the slurry is substantially increased.

As soon as this initial prereaction treatment has developed a molding slurry of suitably expanded and thickened gel consistency, a measured charge thereof may be transferred directly to the piston press filter mold 12 for precision molding to final block form and dimensions. However, in the commercial operation of the process, it may be desirable to provide a period of cooling and storage between the completion of the quiescent prereaction and the time when a measured charge of the prereacted slurry is pressure filter molded. Accordingly, as soon as the prereaction stage has been completed, it may be desirable to quench the prereacted slurry below the temperature at which a substantial amount of further prereaction would take place. This is advantageously done, as in tank 24 or in tank 20, by adding cold water to the prereacted slurry charge to reduce its temperature down to say about 120–150° F. This water dilution quenching operation has no otherwise disadvantageous effect, by reason of the fact that a uniformly homogeneous molding slurry results even when the prereacted slurry is diluted to a water/solids concentration of 30–40 to 1.

In the specific procedure illustrated, the mechanical pressure filter mold 12 comprises a piston press including a cylinder 17 within which a perforate piston 18 is reciprocably mounted. A perforate filter mold base plate 19 is placed or mounted on a supporting conveyor 26 immediately beneath the press. Assuming that blocks are to be molded having dimensions of say 3" x 6" x 36", the press piston 18 would have a face area of 6" x 36", and the base plate 19 of the mold would have a somewhat greater surface area. The piston face and the base plate of the mold preferably comprise flat perforated sheets or plates of brass or other non-corrodible metal which are faced with fine mesh screen 14.

During the period when the mold is being charged, the charge is confined within the piston press cylinder while the side walls of the cylinder rest on the mold base plate. The piston forms the top of the mold and is mounted for reciprocation vertically within the cylinder under the activation of a hydraulic piston pump or the equivalent. The piston press cylinder 17 is also provided with actuating means for raising and lowering its relative to a seat on the mold base plate 19.

When a measured charge of suitably prereacted slurry is transferred into the piston press, drainage of water starts immediately and is accelerated by the descent of the piston toward the mold base plate. Water exits from the mold charge simultaneously through the screens 14 and the perforation apertures in the piston and mold base plate. As the piston descends within the mold, the solids content of a mold charge is compressed to final body dimensions under mechanical pressures which, during at least the initial stages of the molding operation, should be as high as 50 lbs. or more per sq. in. when molding blocks of say 10 lbs./cu. ft. density. At the completion of the molding cycle the mold cylinder is raised off its seat on the supporting mold base, and the piston is raised within the mold chamber. In this way, the wet molded body is immediately freed from all parts of the mold except the mold base. The wet molded body, as made in accordance with the present invention, has adequate cohesive strength so that it may be immediately removed from the supporting mold base plate for transfer to a carriage 27 preliminary to a steam induration curing treatment in an autoclave 28.

Since no leakage of solids takes place, the thickness and density of the body which is finally produced is determined by the molding pressure and the amount of solids introduced into the mold. For molding insulation blocks in the low density range, i. e., 8 to 15 lbs./cu. ft., the best results in rapid and uniform mechanical pressure filter molding are secured, by limiting the solids concentration of the mold charging slurry to 3 to 7% by weight of the slurry.

One of the principal advantages which results from prereacting the solids content of the slurry to a high water-retaining gel state before charging the mold, is that the solids content of the thus prereacted slurry is much more free filtering than a non-prereacted slurry, so that it is possible to complete the molding and partial dewatering operations in a very few seconds. The application of fairly high mechanical pressure to the mold charge by the mold piston during the molding operation is an important factor in producing a body of high wet strength and of ultimate high dry strength. The molding pressure is applied regularly and rapidly throughout the molding cycle, so that for precision molding a block of say three inches thickness the mold charging, dewatering and block shaping operations can all be completed within a molding cycle of 10 to 20 seconds duration.

After completion of the molding operation, and after release of the wet molded body from the mold press, it is necessary to develop a heat cure or hard set of the hydrous calcium silicate binder. This heat curing operation is carried out in an atmosphere of saturated steam in autoclave 28, preferably under a pressure of above approximately 100, and usually about 100–150, lbs. gauge. Complete cure normally requires retention of the body within the autoclave at the indicated pressure so that the molded body obtains the temperature of the atmosphere for a period of at least about four, and preferably eight, hours. To avoid conditions of periodic superheat and, hence, an unsaturated atmosphere within the autoclave during the steam curing period, which promote excessively rapid or non-uniform loss of moisture from the blocks undergoing cure, with resulting tendency to develop edge cracks and fissures in the bodies, it has been found extremely advantageous to maintain a shallow body 30 of liquid water in the base of the autoclave out of contact with the bodies 16 undergoing cure, but in direct contact with the steam atmosphere.

At the completion of the steam curing operation the blocks are removed from the autoclave, after gradual release of the steam pressure at a rate which does not develop excessively rapid or non-uniform release of moisture from the thus cured bodies. The bodies have developed a hardening chemical set of the calcium silicate binder, and as a final step of the process, these bodies are placed on a conveyor or equivalent transporting element and transported to and through a drying oven (not shown). Normally the bodies are subjected to air drying treatment at a temperature of from about 250–400° F. for a period of approximately one-half to two days, depending on the size and shape of the body.

In view of the fact that the high strength/density ratio of the present bodies depends in part on the chemical bond which is developed in the wet molded body during the final hydration hardening treatment, it is quite important that such chemical bond shall be allowed to develop under optimum conditions. The best chemical bond is developed when substantially reactive proportions of hydrated lime and diatomaceous silica are present in the molding slurry. For example, when the molding slurry contained approximately 45% by weight each of hydrated lime and diatomaceous silica and the balance asbestos fibers (based on the dry weight of the resulting block), blocks were produced of 8–10 lbs./cu. ft. density having transverse strengths of 50–80 lbs./sq. in. On the other hand, when the hydrated lime to diatomaceous silica content ratio of the molding slurry was about 30/60 by weight, with the same amount of asbestos reinforcing fibers, the best blocks obtained had a density of about 11.5 lbs./cu. ft., with a modulus of rupture of about 42 lbs./sq. in.

It is usually unnecessary to incorporate additional bonding elements into the body. However, some additional strength may be imparted to the body by incorporating therein a small amount of a bonding material, preferably inorganic, such as bentonite clay, for a supplemental binder as either an addition to the ingredients heretofore indicated or as a substitute for a portion of the silica content. For example, by incorporating about 10% of such clay into a molding mixture containing 10% amosite fiber and approximately 40% each of hydrated lime and diatomaceous silica, it was possible to produce a body of 10.5 lbs./cu. ft. having a modulus of rupture of 125 lbs./sq. in.

By piston press molding highly prereacted slurries comprising 10–20% mineral fibers such as amphibole asbestos and reactive proportions of lime and diatomaceous silica the present method produces insulation blocks having a cured dry density within the range 8–15 lbs./cu. ft. and having a strength/density ratio of at least 6. When molding blocks of the same size under the same piston press pressure, a prereacted molding slurry containing 10% asbestos together with about 45% each of hydrated lime and diatomaceous silica yielded a block of approximately 15 lbs./cu. ft. density with a modulus of about 90, when the gel forming prereaction was carried out at a temperature of 170° F. for three hours. It was possible to mold blocks of the same initial composition having a dry density of 10 lbs./cu. ft. and a modulus greater than 60, by carrying out the prereaction gel forming stage for three hours at a temperature of 180–210° F., with the same molding and hydration hardening conditions. It has been found, however, that the advantage of this higher prereaction temperature tapers off rapidly as the gel forming temperature closely approaches 210° F., and in fact, there are observable disadvantages as to strength of final block in carrying out the initial gel forming prereaction for over two hours at temperatures above 210° F.

As showing how the strength/density ratio is improved by increasing the prereaction temperature when carrying out the initial gel forming prereaction in the range 180–210° F., blocks of 10 lbs./cu. ft. density were produced by subjecting slurries of identical composition to prereaction gelling for the same period of time (2½ hours) at respective temperatures of 180, 190, and 200° F., followed by identical high pressure mechanical filter molding and hydration hardening cure treatment. Blocks of 10 lbs. density produced by molding slurries prereacted at 180° F. had a modulus of 60–80 lbs./cu. ft. Blocks molded from a slurry prereacted at 190° F. had a modulus of rupture of 80–110 lbs./sq. in., and blocks molded from a slurry prereacted at a temperature of 200° F. had a modulus of rupture of 100–120 lbs./sq. in. Similarly, blocks of 12 lbs. density molded from slurries prereacted respectively at 180, 190 and 200° F. had respective moduli of rupture averaging 108 lbs./sq. in., 137 lbs./sq. in., and 153 lbs./sq. in.

In producing a block having an ultimate dry density of 10.2 lbs./cu. ft. by the present method, the water content of the prereacted gel slurry at the time of its charging to the mold was 2500% by weight of the solids content. At the completion of the mechanical pressure filter molding operation the wet molded blocks still contained 540% by weight of water based on the weight of dry solids. After approximately ten hours of steam curing treatment in a saturated steam atmosphere at a pressure of 100 lbs. gauge, the fully cured block, prior to drying, still contained 400% by weight of water based on the weight of dry solids.

Insulating blocks produced by the present method having an average density of 10 lbs./cu. ft. and containing 10% by weight of approximately equal proportions of chrysotile and amosite asbestos fibers in a matrix of hydrated and hardened calcium silicate, exhibited an average transverse strength or modulus of rupture approximating 80 lbs./sq. in. A block of 10 lbs. density and aproximately 80 lbs. modulus was found by test to have a thermal conductivity of .40 B. t. u. per hour/sq. ft./in. thickness/° F. at a mean temperature of 300° F. Structurally the matrix in such blocks comprises voluminous flocks of fiber-linked and agglomerated cellular particles of hydrated calcium silicate, said particles being disposed in laminated and physically adhered compact cohesive relation (by reason of the piston press molding treatment) and chemically bonded by films of calcium silicate developed during the final hydration hardening cure.

While the present method has particular utility for producing insulation blocks of 8–15 lbs. density which retain their original mold dimensions and strengths in use at temperatures up to 1200° F., it can also be applied to the manufacture of strong structural blocks and boards having insulating characteristics with densities normally ranging between 15 and 40 lbs./cu. ft. and transverse strengths of approximately 300–1000 lbs./sq. in. Such structural shapes were produced by piston press filter molding the dilute prereacted lime-silica slurries heretofore described but containing 10–40% asbestos fiber. The stronger boards and blocks were produced by employing a proportion of asbestos reinforcing fibers of approximately 20–40%, and more strength and hardness were imparted by incorporating small amounts (up to 10%) of bentonite clay in the molding mixture. One board molded from a prereacted slurry containing only 10% amosite fiber and the balance lime and diatomaceous silica had a density of 20 lbs./cu. ft. and a modulus of rupture of 500 lbs./sq. in. Other boards containing 30% amosite fiber and the balance prereacted lime-silica had densities of 18–20 lbs./cu. ft. and an average modulus of 570 lbs./sq. in.

The extensive prereaction gelling of the lime-silica binder would not be practical in the manufacture of insulating and structural bodies if it were not for the use of comparatively high piston press molding pressures during the filter molding operation, whereby a cohesive physical shape-retaining bond is developed between solid particles in the precision molded green blocks of sufficient strength to withstand all normal handling treatment and permit removal of the green blocks immediately from the mold prior to subsequent hydration hardening cure. The molding slurry solid particles comprise a highly microporous framework or skeleton of reacted hydrous calcium silicate.

When the prereaction gel forming stage is carried out at a temperature of 180° F. for a time of about two hours, the present process develops at least 30% chemical prereaction of available lime with silica. The process contemplates substantially maximum feasible hydration prereaction volume expansion of slurry solids, and by employing comparatively high pressure mechanical filter press molding, followed by pressure steam hydration hardening and drying steps, it is possible to produce low density insulation blocks of relatively high strength. While there is a correspondingly less opportunity for further chemical binder reaction after molding with the present method, such reaction during the final hydration hardening stage is more effective, due to the initial mixing procedure preferably employed and the strongly cohesive physical bond imparted by the mechanical press molding operation.

The invention which has been thus described by detailed example is not limited as to such details and it is to be understood that variations, changes and modifications are contemplated within the scope of the invention as defined by the following claims.

What I claim is:

1. In the manufacture of precision molded insulation shapes of high strength and substantial volume stability in use at temperatures up to 1200° F., the steps comprising, forming a dilute aqueous slurry suspension of approximately reactive proportions of finely divided diatomaceous silica and lime, together with mineral reinforcing fibers, said slurry having a water content of at least approximately 15 parts for each part by weight of dry solids, subjecting the slurry to substantially quiescent prereaction at a temperature of approximately 170–210° F. for a period of approximately one-half to three hours to develop an expanded hydrated calcium silicate gel, piston press filter molding said gel slurry solids to final shape dimensions under rapidly applied mechanical pressure by a piston so as to exert a pressure of at least about 50 p. s. i. on the mold charge, steam indurating the molded gel in a pressure steam atmosphere for several hours to develop hydration hardening of calcium silicate binder, and drying the thus hardened shape.

2. In the manufacture of thermal insulating bodies, the steps comprising, forming a dilute aqueous slurry comprising approximately reactive proportions of finely divided microporous siliceous material and caustic lime together with 10–40% by weight of the total solids of asbestos fibers, said slurry having a water content of at least approximately fifteen parts for each part by weight of dry solids, subjecting the slurry to quiescent prereaction with periodic mild agitation at a temperature of approximately 170–210° F. for a period of at least approximately one-half hour to develop an expanded hydrated calcium silicate gel, rapidly filter molding said gel slurry solids under mechanical pressure to final block form and dimensions by a piston so as to exert a pressure of at least about 50 p. s. i. on the mold charge, steam indurating the molded block under pressure in a steam atmosphere to develop hydration hardening of calcium silicate binder, and drying the thus hardened block.

3. In the manufacture of thermal insulating bodies, the steps comprising, forming a dilute aqueous slurry containing approximately reactive proportions of finely divided microporous siliceous material and caustic lime together with approximately 10% by weight of heat-resistant mineral fibers, said slurry having a water content of at least approximately fifteen parts by weight to one part of dry solids, subjecting said slurry to quiescent reaction at a temperature of approximately 170–210° F. for a period of approximately one-half to three hours to develop extensive prereaction gelling and swelling of hydrated calcium silicate particles, subjecting a measured charge of said slurry to mechanical press filter molding under a pressure exerted by a piston of at least about 50 lbs./sq. in., and steam indurating the thus molded block for several hours in an atmosphere of saturated steam to develop hydration hardening of the calcium silicate binder.

4. The method of manufacturing a heat-resistant light weight insulation block, which comprises, forming a dilute aqueous slurry of approximately equal dry weight proportions of finely divided diatomaceous silica and caustic lime, together with 10–20% by weight of the total solids of high temperature-resistant mineral fibers, said slurry having a water to solids ratio of at least fifteen to one by weight, subjecting said slurry to quiescent reaction, with periodic mild agitation, at a temperature of approximately 170–210° F. for a period of one-half to three hours to develop extensively gelled and enlarged hydrated calcium silicate particles, subjecting a measured volume of said expanded gel slurry to mechanical press filter molding to final block form and dimensions by a piston so as to exert a pressure of at least about 50 p. s. i. on the mold charge, steam indurating the resulting wet molded block for several hours in an atmosphere of saturated steam to develop complete hydration hardening of calcium silicate binder, and drying the thus hardened product.

5. In the manufacture of precision molded insulation shapes of high strength and substantial volume stability in use at temperatures up to 1200° F., the steps comprising, forming an aqueous suspension of staple reinforcing fiber and finely divided siliceous materials, forming a second aqueous suspension of finely divided lime, mixing the thus formed suspensions, diluting the formed slurry to a water content of at least approximately 15 parts for each part by weight of dry solids, subjecting the slurry to substantially quiescent prereaction at a temperature of approximately 170–210° F. for a period of approximately one-half to three hours to develop an expanded hydrated calcium silicate gel, piston press filter molding said gel slurry solids to final shape dimensions under rapidly applied mechanical pressure by a piston so as to exert a pressure of at least about 50 p. s. i. on the mold charge, steam indurating the molded gel in a pressure steam atmosphere for several hours to develop hydration hardening of calcium silicate binder, and drying the thus hardened shape.

6. In the manufacture of precision molded insulation shapes of high strength and substantial volume stability in use at temperatures up to 1200° F., the steps comprising, forming a suspension of staple reinforcing fiber and finely divided siliceous material in at least approximately 15 parts by weight of water per part of suspended solids, heating said suspension to a temperature of approximately 170–210° F., adding to said suspension an aqueous dispersion of finely divided lime, thereby forming a dilute slurry of lime, finely divided siliceous material and staple reinforcing fiber, subjecting said slurry to substantially quiescent prereaction at said elevated temperature for a period of approximately one-half to three hours to develop an expanded hydrated calcium silicate gel, piston press filter molding said gel slurry solids to final shape dimensions under rapidly applied mechanical pressure by a piston so as to exert a pressure of at least about 50 p. s. i. on the mold charge, steam indurating the molded gel in a pressure steam atmosphere for several hours to develop hydration hardening of calcium silicate binder, and drying the thus hardened shape.

7. In the manufacture of precision molded insulation shapes of high strength and substantial volume stability in use at temperatures up to 1200° F., the steps comprising, forming an aqueous suspension of staple reinforcing fiber and finely divided siliceous materials, forming a second aqueous suspension of finely divided lime, mixing the thus formed suspensions, diluting the formed slurry to a water content of at least approximately 15 parts for each part by weight of dry solids, subjecting the slurry to substantially quiescent prereaction at a temperature of approximately 170–210° F. for a period of approximately one-half to three hours to develop an expanded hydrated calcium silicate gel, piston press filter molding said gel slurry solids to final shape dimensions under rapidly applied mechanical pressure by a piston so as to exert a pressure of at least about 50 p. s. i. on the mold charge, steam indurating the molded gel under pressure in a saturated steam atmosphere for several hours to develop hydration hardening of calcium silicate binder, and drying the thus hardened shape.

8. In the manufacture of precision molded insulation shapes of high strength and substantial volume stability in use at temperatures up to 1200° F., the steps comprising, forming a suspension of staple reinforcing fiber and finely divided siliceous material in at least approximately 15 parts by weight of water per part of suspended solids, heating said suspension to a temperature of approximately 170–210° F., adding to said suspension an aqueous dispersion of finely divided lime, thereby forming a dilute slurry of lime, finely divided siliceous material and staple reinforcing fiber, subjecting said slurry to substantially quiescent prereaction at said elevated temperature for a period of approximately one-half to three hours to develop an expanded hydrated calcium silicate gel, piston press filter molding said gel slurry solids to final shape dimensions under rapidly applied mechanical pressure by a piston so as to exert a pressure of at least about 50 p. s. i. on the mold charge, steam indurating the molded gel under pressure in a saturated steam atmosphere for several hours to develop hydration hardening of calcium silicate binder, and drying the thus hardened shape.

9. In the manufacture of precision molded insulation shapes of high strength and substantial volume stability in use at temperatures up to 1200° F., the steps comprising, forming a dilute aqueous slurry suspension of staple reinforcing asbestos fibers together with finely divided reactive siliceous material and finely divided lime, said slurry having a water content of at least approximately 15 parts for each part by weight of dry solids, subjecting the slurry to substantially quiescent prereaction at a temperature of approximately 170–210° F. for a period of approximately one-half to three hours to develop an expanded hydrated calcium silicate gel, piston press filter molding said gel slurry solids to final shape dimensions under applied mechanical pressure by a piston so as to exert a pressure of at least about 50 p. s. i. on the mold charge, steam indurating the molded gel in a pressure steam atmosphere for several hours to develop hydration hardening of calcium silicate binder, and drying the thus hardened shape.

10. In the manufacture of precision molded insulation shapes of high strength and substantial volume stability in use at temperatures up to 1200° F., the steps comprising, forming a suspension of staple reinforcing asbestos fiber and finely divided siliceous material in at least approximately 15 parts by weight of water per part of suspended solids, heating said suspension to a temperature of approximately 170–210° F., adding to said suspension an aqueous dispersion of finely divided lime, thereby forming a dilute slurry of lime, finely divided siliceous material and asbestos fiber, subjecting said slurry to substantially quiescent prereaction at said elevated temperature for a period of approximately one-half to three hours to develop an expanded hydrated calcium silicate gel, piston press filter molding said gel slurry solids to final shape dimensions under applied mechanical pressure by a piston so as to exert a pressure of at least about 50 p. s. i. on the mold charge, steam indurating the molded gel in a pressure steam atmosphere for several hours to develop hydration hardening of calcium silicate binder, and drying the thus hardened shape.

References Cited in the file of this patent

UNITED STATES PATENTS

| Number | Name | Date |
|---|---|---|
| 1,520,893 | Teitsworth | Dec. 30, 1924 |
| 1,932,971 | Huttemann et al. | Oct. 31, 1933 |
| 2,432,981 | Abrahams et al. | Dec. 23, 1947 |